(12) United States Patent
Steinhilber et al.

(10) Patent No.: US 12,384,068 B2
(45) Date of Patent: Aug. 12, 2025

(54) SLICING MACHINE HAVING A KNIFE MONITORING DEVICE

(71) Applicant: Bizerba SE & Co. KG, Balingen (DE)

(72) Inventors: Ralf Steinhilber, Balingen (DE); Markus Bodmer, Messstetten (DE)

(73) Assignee: BIZERBA SE & CO. KG, Balingen (DE)

( * ) Notice: Subject to any disclaimer, the term of this patent is extended or adjusted under 35 U.S.C. 154(b) by 0 days.

(21) Appl. No.: 18/159,096

(22) Filed: Jan. 25, 2023

(65) Prior Publication Data

US 2023/0182338 A1  Jun. 15, 2023

Related U.S. Application Data

(62) Division of application No. 16/488,266, filed as application No. PCT/EP2018/054694 on Feb. 26, 2018, now abandoned.

(30) Foreign Application Priority Data

Feb. 27, 2017  (EP) .................................... 17158221

(51) Int. Cl.
*B26D 7/12* (2006.01)
*B23Q 17/09* (2006.01)
(Continued)

(52) U.S. Cl.
CPC ................. *B26D 7/12* (2013.01); *B26D 1/15* (2013.01); *B26D 5/00* (2013.01); *B26D 7/0616* (2013.01);
(Continued)

(58) Field of Classification Search
CPC .......... B26D 1/143; B26D 1/15; B26D 1/153; B26D 7/06; B26D 7/0616; B26D 7/08;
(Continued)

(56) References Cited

U.S. PATENT DOCUMENTS 5,315,789 A * 5/1994 Takashi ................ G05B 19/404
451/5
5,591,072 A * 1/1997 Tweed ..................... B26D 7/12
451/422
(Continued)

FOREIGN PATENT DOCUMENTS

EP  2532477 A2  12/2012
EP  2572840 A2  3/2013
(Continued)

*Primary Examiner* — Evan H MacFarlane
(74) *Attorney, Agent, or Firm* — LEYDIG, VOIT & MAYER, LTD.

(57) ABSTRACT

An electrically operated slicing machine cuts slices from material to be cut. The slicing machine has a slicing device, which includes an electric blade motor; a circular blade rotatably driven by the electric blade motor; and a carriage that is moved parallel to the circular blade to receive and move the material to be cut. A blade monitor monitors a condition of the circular blade. The blade monitor has a
(Continued)

current measuring device that measures a blade motor current of the electric blade motor. A grinding monitor monitors a grinding process executed by a blade grinder.

20 Claims, 5 Drawing Sheets

(51) Int. Cl.
 B26D 1/15 (2006.01)
 B26D 5/00 (2006.01)
 B26D 7/06 (2006.01)
(52) U.S. Cl.
 CPC ...... *B23Q 17/0961* (2013.01); *B26D 2210/02* (2013.01)
(58) Field of Classification Search
 CPC . B26D 7/088; B26D 7/12; B26D 5/00; B26D 5/007; B26D 7/28; B23Q 17/09; B23Q 17/0952; B23Q 17/0961
 See application file for complete search history.

(56) References Cited

U.S. PATENT DOCUMENTS

| | | |
|---|---|---|
| 8,220,383 B2 | 7/2012 | Rummel et al. |
| 2001/0029148 A1* | 10/2001 | Knecht ............... B24B 49/02 451/11 |
| 2005/0092153 A1* | 5/2005 | Kuchler ............... B26D 5/00 83/478 |
| 2009/0211417 A1* | 8/2009 | Rummel ............... B26D 5/00 83/72 |
| 2009/0255418 A1 | 10/2009 | Rummel et al. |
| 2012/0309266 A1 | 12/2012 | Schroeder et al. |
| 2013/0074667 A1 | 3/2013 | Weber et al. |
| 2013/0133498 A1 | 5/2013 | Klingler |
| 2018/0193978 A1* | 7/2018 | Watanabe ............ B24B 5/045 |

FOREIGN PATENT DOCUMENTS

| | | |
|---|---|---|
| EP | 2603360 B1 | 7/2015 |
| WO | 2007078451 A2 | 7/2007 |
| WO | 2009086380 A2 | 7/2009 |
| WO | 2016074816 A1 | 5/2016 |

* cited by examiner

SLICING MACHINE HAVING A KNIFE MONITORING DEVICE

CROSS-REFERENCE TO PRIOR APPLICATIONS

This application is a divisional of U.S. application Ser. No. 16/488,266 filed on Aug. 23, 2019 as a U.S. National Phase Application under 35 U.S.C. § 371 of International Application No. PCT/EP2018/054694, filed on Feb. 26, 2018, and claims benefit to European Patent Application No. EP 17158221.6, filed on Feb. 27, 2017, the entire disclosures of which are hereby incorporated by reference herein.

FIELD

The present invention relates to an electrically operated slicing machine for cutting off slices from, in particular, an elongate item to be cut, preferably food, having a cutting device.

BACKGROUND

A conventional slicing machine is disclosed, for example, in U.S. Pat. No. 8,220,383 B2 and WO2007/078451 A2.

Over time, the circular knife of conventional slicing machines wears as a result of operation. For proper operation, it is therefore necessary to resharpen the circular knife regularly. To this end, a user of the slicing machine can, usually manually, place a grinding device, in particular having a grinding wheel, onto the slicing machine or onto the circular knife and start a special grinding program for the slicing machine.

In the case of previously customary slicing machines, it was left up to the user to determine whether the knife must be ground at all and if so when. The ideal point in time for regrinding is therefore often missed so that depending on the individual user behavior, the circular knife is ground too often or too seldom, the cross-section is unnecessarily rough, and the like. In the case of too frequent grinding processes, unnecessary production downtimes with corresponding work interruptions for the grinding and cleaning operations result. Increased wear and as a consequence increased replacement part costs are often the result.

As discussed in the above cited U.S. Pat. No. 8,220,383 B2 and WO2007/078451 A2, generic slicing machines can have a knife monitoring device for monitoring the state of the circular knife.

In this case, the knife monitoring device detects the total number of revolutions of the circular knife or the service life of the circular knife. If a predetermined minimum rotational speed or minimum service life is exceeded, the user is given an indication signal with which a regrinding of the circular knife is recommended. Cutting results and/or service lives can thus be improved in a simple manner.

It is known from practice, however, that the mere total number of revolutions and the mere service life cannot provide sufficiently accurate statements about the actual degree of wear of the circular knife or about the overall state of the slicing machine. For example, idling, differently hard or differently sized products to be cut can result in different wear of the circular knife at identical numbers of revolutions of the machine.

A non-generic slicing machine, which operates according to a different functional principle and in which the item to be cut is not supported movably in relation to its longitudinal direction is disclosed in EP 2 572 840 A2. EP 2 572 840 A2 teaches deriving a maintenance measure, the resharpening of the cutting knife among other things, directly from the current knife motor current.

SUMMARY

An embodiment of the present invention provides an electrically operated slicing machine that cuts slices from material to be cut. The slicing machine has a slicing device having an electric blade motor; a circular blade rotatably driven by the electric blade motor; and a carriage that is moved parallel to the circular blade, and receives and moves the material to be cut. A blade monitor monitors a condition of the circular blade. The blade monitor has a current measuring device configured to measure a blade motor current of the electric blade motor. A grinding monitor monitors a grinding process executed by a blade grinder.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
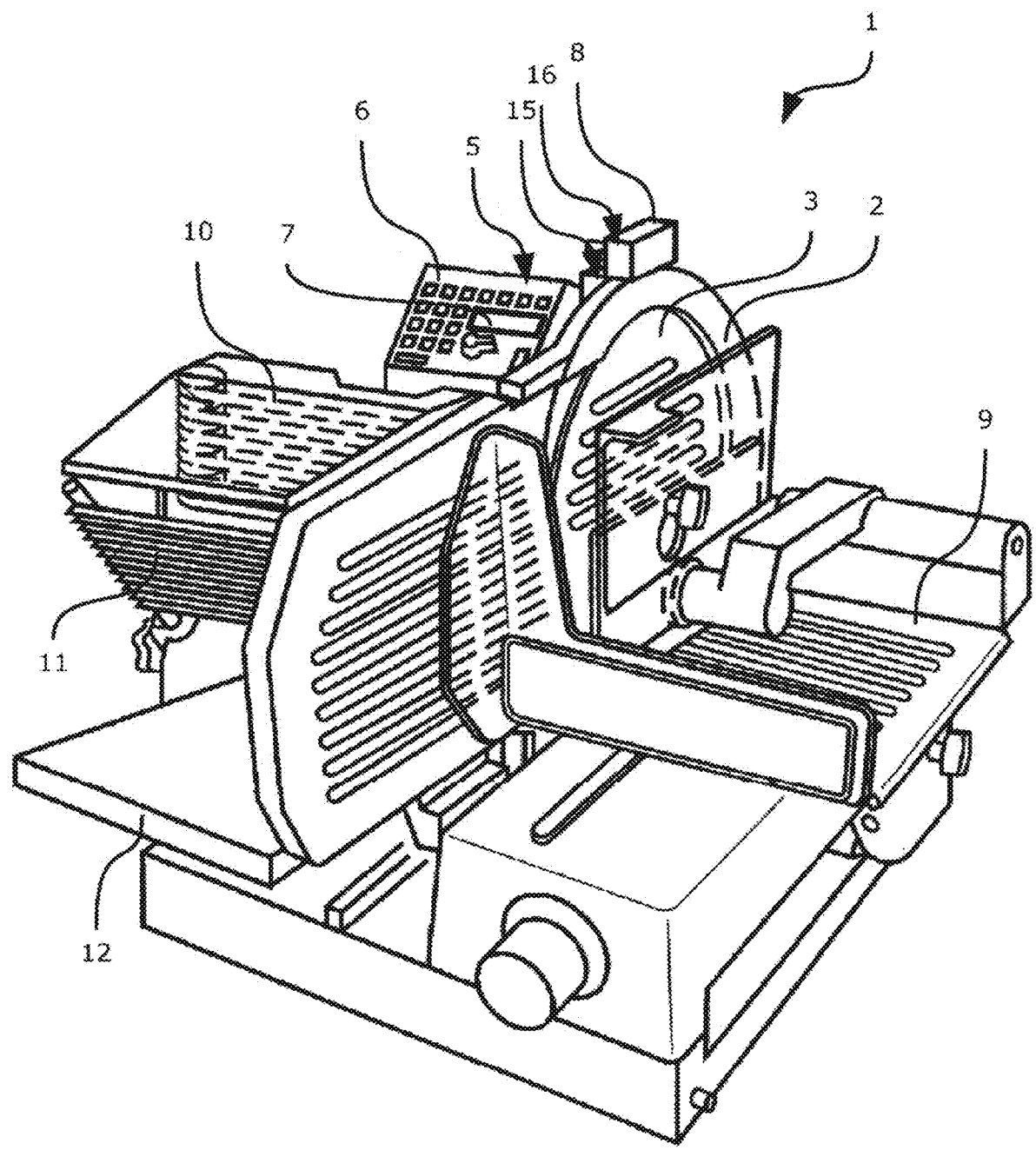
FIG. 1 illustrates a slicing machine.

Embodiments of the present invention improve a slicing machine, in particular with regard to the quality of the detection of the current state of the circular knife.

Embodiments of the present invention provide the improved slicing machine in a technically particularly simple and surprisingly effective manner, wherein the cutting device includes a rotating circular knife driven by an electric knife motor, and having a carriage, movable in parallel to the circular knife, for receiving and moving the item to be cut, and having a knife monitoring device for monitoring the state of the circular knife, in which the knife monitoring device has a current-measuring device for measuring the knife motor current.

Tests have shown that the temporal profile of the knife current represents a particularly sensitive measure, which is far more meaningful than the current knife current, for current state parameters of the slicing machine, in particular for the state of the circular knife.

The electric power currently consumed by the knife motor can in particular be inferred very easily from the knife motor current. This currently consumed electric power in turn may provide a reliable measure of the resistance opposing the knife motor by the item to be cut. This resistance in turn is a consequence of various friction influences, in particular due to the cutting processes, soiling of the slicing machine, and wear of other parts of the slicing machine, for example drive belts for the circular knife and the like. Consideration of the temporal profile of the knife motor current is of particular importance in this respect. The knife motor current is directly influenced by various boundary conditions, for example by the hardness of the item to be cut at the time, the current soiling of the machine, and the knife sharpness itself. For this reason, the knife motor current seems unsuitable for inferring a cutting characteristic value which is to solely reflect the knife sharpness since the other parameters mentioned are often not known or can only be input into the knife monitoring device with great effort. For this reason, a currently excessive knife motor current can allow conclusions about a circular knife to be sharpened, but it may also just be the case that a very hard item to be cut is currently being cut. By taking into account the temporal profile, however, the state of the circular knife can be reliably inferred from the knife motor current.

The knife motor current can also be detected very easily without much additional technical effort.

The current knife motor current can thus be measured and the state of the slicing machine and in particular of the circular knife can then be deduced therefrom in a particularly simple manner.

For this purpose, the slicing machine can have a control unit which is designed to determine a cutting characteristic value, in particular a soiling characteristic value and/or a wear characteristic value and/or a knife sharpness characteristic value, from the currently measured knife motor current and/or its temporal profile.

It has been found that the power consumption of the knife motor, and thus also the knife motor current, move in well-definable ranges during a cutting process. For example, because the control unit evaluates how often and in each case how long the power consumption is within these ranges, the control unit can detect whether and how many slices of an item to be cut are cut. A cutting characteristic value, in particular a knife sharpness characteristic value, can easily be derived therefrom. A particularly precise measurement can be achieved if the knife motor current and/or the profile of the knife motor current is tracked and detected during the cutting of a single slice. For example, it can thus be determined which type of item to be cut, for example slices with a large or small diameter, are in each case currently cut.

The control unit can, for example, determine a soiling characteristic value as a measure of the soiling of the slicing machine from the power consumption and/or the temporal profile of the power consumption for times in which the circular knife does not cut slices. For example, it can thus be determined whether fat or other particles of the item to be cut between a knife cover and the circular knife slow down the circular knife. A wear characteristic value which indicates whether and to what extent other parts of the slicing machine may be worn can also be determined.

A convenience function for the user of the slicing machine can thus be realized in a particularly simple manner. The user no longer has to attend actively and of his own accord to whether or when it is necessary to regrind the knife since the control unit can continuously and automatically determine corresponding state indicators. The circular knife service life or the slicing machine service life can thus be optimized without much effort.

In one embodiment, the slicing machine, preferably the knife monitoring device, includes a non-volatile data memory. The control unit is designed to store the currently measured knife motor current and its temporal profile or intermediate results derived therefrom in the non-volatile data memory. In this respect, it is particularly advantageous if the intermediate results from the temporal profile of the motor current represent an integral value of a net current of the knife motor starting from the completion of a previously run knife grinding program. The net current can be determined, for example, as the difference between a knife motor current and a load-independent current component. The knife motor current corresponds to the current consumption of the knife motor when cutting or when retracting the carriage. The load-independent current component corresponds to the current consumption of the knife motor when idling. The net current of the knife motor can also be stored as an intermediate result in the non-volatile data memory. The net current corresponds to the load-dependent current component of the knife motor current.

In particularly preferred embodiments of the invention, the slicing machine has a grinding monitoring device for monitoring a grinding process by means of a knife grinding device. The grinding monitoring device can in particular be part of the knife monitoring device and/or the knife monitoring device can assume the function of the grinding monitoring device.

For this purpose, it can be provided that the grinding monitoring device is designed to measure and evaluate the knife motor current during a grinding process.

A grinding process is usually accompanied by an increased power consumption and consequently a particularly increased knife motor current. Furthermore, a grinding process differs from a conventional cutting process in that the power consumption in the former is increased over a longer period of time, whereas short-term, periodic fluctuations (caused by cutting individual slices) of the power consumption or of the knife motor current can be measured in the latter.

The grinding process is usually followed by a sharpening or deburring process. This process, in turn, can easily be detected on the basis of a short-term power consumption drop due to switching to a sharpening stone or the like as well as a subsequent short-term power consumption increase due to the actual deburring. The knowledge that due to the structure of conventional deburring wheels the current consumption during deburring generally differs from the current consumption during grinding, in particular exceeds the current consumption during grinding, can also be used. If this power characteristic after a grinding process is not detected by the knife monitoring device, it can be concluded that the deburring process did not take place. Then, a corresponding indication signal that the deburring process has to be carried out can, for example, be signaled to the user.

Furthermore, the grinding monitoring device may also be designed to detect and/or evaluate even slight fluctuations, for example in the range from 1 to 10 percent of the average knife motor current, during the grinding process. The progress of the grinding process can then be tracked in a particularly simple manner. Furthermore, by detecting the power consumption during grinding within the range relevant to the grinding, the degree of wear of the grinding wheel can be inferred.

In particular, if the power consumption during grinding drops below a predetermined value, this can be evaluated, preferably by the control unit, as an indication of a grinding wheel that is used up and thus to be replaced. In particular, it can be detected on the basis of a slight power consumption during grinding whether the grinding wheel is worn or soiled, in particular soiled by fat. A corresponding indication signal that the grinding wheel is to be replaced can then be signaled to the user, for example.

If the power consumption is not in the intended range, an indication signal that the grinding process does not run or runs incorrectly and/or the knife grinding device is mounted incorrectly or not mounted can analogously be output.

The slicing machine may also have a, preferably automatically operable, knife grinding device.

The knife grinding device may be manually attachable to the slicing machine. Alternatively, however, the knife grinding device can also be fixedly arranged on the slicing machine. The knife grinding device can then be designed particularly advantageously for automatic operation. For example, it can be designed such that it is automatically put into operation when a grinding program starts. The slicing machine, in particular the control unit, can thus monitor the state of the circular knife and, if necessary, automatically start a grinding program and thus the knife grinding device. A further increase in convenience can thereby be achieved.

It can also be provided that the slicing machine has a signal output unit, in particular a display unit and/or an acoustic output unit, by means of which the necessity of initiating a knife grinding process can be indicated visually and/or acoustically. With such a signal unit, indication signals can particularly easily be output to the user. For example, the user can thereby be informed about the state of the circular knife and/or be informed that the circular knife is preferably to be reground soon.

The invention also relates to a method for monitoring an electrically operated slicing machine for cutting off slices from, in particular, an elongate item to be cut, preferably foods, according to the invention having a cutting device, wherein the cutting device includes a rotating circular knife driven by an electric knife motor, and having a carriage, movable in parallel to the circular knife, for receiving and moving the item to be cut, and having a knife monitoring device for monitoring the state of the circular knife, wherein the knife motor current and/or the temporal profile thereof are sensed as measurement data for input into the knife monitoring device and a current cutting characteristic value, in particular a soiling characteristic value and/or a wear characteristic value and/or a knife sharpness characteristic value, is determined from these measurement data.

With this method, a slicing machine according to the invention can thus be operated in a particularly advantageous manner. The knife motor current can be detected and evaluated particularly easily. As a result, one or more cutting characteristic values can be determined, which can then be used further to ensure optimal functioning of the slicing machine.

Provision can also be made for a load-dependent current component and/or a load-independent current component of the knife motor current to be determined as measurement data. When cutting or when retracting the carriage, the knife motor current corresponds to the sum of the load-dependent current component and the load-independent current component. The load-independent current component corresponds to the current consumption of the knife motor when idling.

The load-dependent and the load-independent current components can be identified in particular in that they move in respectively typical value ranges of the knife motor current. In particular, the load-independent current component moves in a very low value range and the load-dependent current component moves in a higher value range.

By independently evaluating these current components, even more precise cutting characteristic values can be derived.

For this purpose, the soiling characteristic value and/or the wear characteristic value can be derived from the load-independent current component and/or the knife sharpness characteristic value can be derived from the load-dependent current component. This is possible since in particular the load-dependent current component relates to the time phases in which the circular knife either cuts the item to be cut or is ground or deburred.

It is particularly advantageous if the current load-independent component is determined at predefined time intervals, as a result of predefined events, in particular as a result of switching on the slicing machine, and/or after reaching a predefined, in particular periodic, cutting power limit.

In particular, at the beginning of each start-up of the slicing machine the no-load current of the knife motor can first be measured and the current load-independent current component can be determined therewith.

The soiling characteristic value and/or the wear characteristic value can then be determined in a particularly simple manner, for example when starting up the slicing machine. As needed, an indication signal, for example to service the slicing machine, for example replace a belt, before further use, can then be output to the user. These characteristic values can also be taken into account as "base loads" in order to be able to detect the state of the circular knife even more precisely. Since the degree of soiling of the slicing machine increases over the course of a day until the slicing machine is cleaned, the soiling characteristic value can also be determined as shown several times a day at times in which no cutting takes place.

It can also be provided that the measurement data or intermediate results determined from the measurement data, in particular a net current of the knife motor, are temporarily stored in a non-volatile data memory. The net current can be determined, for example, as the difference between the knife motor current and the load-independent current component. The net current thus corresponds to the total current in a cutting process minus the no-load current. Thus, the net current is the current used for the actual separation of a slice from the item to be cut. The net current during a cutting process is time-variable since more or less resistance arises at the circular knife depending on the overlap of the item to be cut and the circular knife. The net current can be stored as an intermediate result in the non-volatile data memory.

The non-volatile data memory may be a flash memory, for example.

In the data memory, the histories of several intermediate results can be stored. A temporal profile, for example of the net current, can thus be registered and evaluated at a later point in time. Particularly slowly progressing wear can thus be identified, for example.

It is in particular particularly advantageous if an integral value of the net current, in particular starting from the completion of a previously run knife grinding program, is determined as an intermediate result. This means that a summation value, which then represents the integral value, is formed from a plurality of previous measured values of the net current.

In one embodiment, an integral value of the knife motor current is formed as an intermediate result. The integral value of the load-independent current component over the same time period is then subtracted therefrom. This in turn results in an integral value of the net current, i.e. of the load-dependent current component. The integral value of the load-independent current component can also be formed by point measurements of the load-independent current component and multiplication with a corresponding time factor. In contrast, the integral value of the knife motor current is determined on the basis of periodically measured current values, wherein a plurality of measurements in a time period required for a cutting process is taken as a basis. This is due in particular to the fact that the knife motor current and in particular the load-dependent current component is very variable as a function of the cutting process and the load-independent current component is relatively constant in comparison thereto. The integral value of the net current forms a measure for the cutting characteristic value. This results in particular advantages in the detection of the state of the slicing machine or of the circular knife.

The summation or integration allows integral values to be formed which can particularly sensitively indicate the state of the circular knife. In particular, this makes it possible, for example, to differentiate particularly sensitively between a sharp and a blunt circular knife, or a circular knife to be ground. The currently measured knife motor current in each case is influenced by a plurality of different parameters, for example by properties of the item to be cut, by wear, and by the actual sharpness of the circular knife. Forming integral values can achieve averaging, by means of which interfering influences can be largely neutralized or eliminated. For example, a soft item to be cut wears the circular knife less during cutting than a hard item to be cut. Less knife motor current is also used to cut the soft item to be cut than when cutting the hard item to be cut. An item to be cut which is small in diameter wears the circular knife less than an item to be cut of a large diameter. Less knife motor current is also used to cut a small item to be cut than when cutting a large item to be cut. The integral value of the knife motor current thus represents the load of the circular knife since the last grinding process and is a good measure for the current degree of sharpness of the circular knife and thus for the cutting characteristic value.

Since the state of the circular knife at the completion of a previously run knife grinding program is known, the circular knife should be sharp, the progressing wear of the circular knife can be tracked particularly easily by starting the integration at the completion of this knife grinding program, and an absolute value for the sharpness or quality of the circular knife can be determined at least approximately.

It is also conceivable for a target/actual comparison to a predefined limit value $G_1$ and/or to a dynamically determined limit value $G_2$ to take place with a measurement datum and/or with an intermediate result. By means of a target/actual comparison, a maintenance measure, in particular a knife grinding program, can, for example, be started in a particularly simple manner as needed. For this purpose, the limit value can on the one hand be fixedly predefined. Alternatively and/or additionally, the limit value can also be determined dynamically. For example, the limit value can be formed as a difference between a predefined value and a currently measured value, for example the soiling characteristic value.

Furthermore, an indication signal can also be output via a signal output unit, in particular a display unit and/or an acoustic output unit, when the value of the cutting characteristic value reaches and/or exceeds or falls below the predefined limit value $G_1$ and/or the dynamically determined limit value $G_2$.

Then, a user can, for example, be informed and/or urged to start a maintenance process, in particular the knife grinding program.

Provision can also be made for a knife grinding program to be started automatically to sharpen the circular knife when the value of the cutting characteristic value reaches and/or exceeds or falls below the predefined limit value $G_1$ and/or the dynamically determined limit value $G_2$. There is then no need for any further action by the user in order to start the knife grinding program, as a result of which the slicing machine becomes even more user-friendly.

It can also be provided that by means of the knife motor current and/or its temporal profile, an operation of the slicing machine during the knife grinding program is detected, monitored, in particular its duration measured, and/or controlled, in particular ended. This not only makes it possible to detect whether a circular knife is to be ground or not, but it is also possible, for example, to monitor whether the grinding process runs properly and/or whether the circular knife is or was reground sufficiently.

Alternatively or additionally, information about the state of the circular knife after the grinding process can also be derived so that this information can be taken into account, for example, during a subsequent use of the slicing machine for cutting an item to be cut, and thus the wear of the circular knife can be monitored even more precisely.

Experience has shown that the circular knife must be replaced as soon as the diameter of the circular knife falls below a predefined minimum value, for example at least 10 mm smaller than the diameter of a new circular knife, due in particular to repeated regrinding processes. A corresponding cutting characteristic value which is able to indicate the point in time at which the circular knife should be replaced can also be obtained in a particularly simple manner. For this purpose, in particular the total duration of all grinding processes of the respective circular knife can be summed or formed and compared to a predefined maximum permissible grinding time. If the maximum permissible grinding time is exceeded, the circular knife must be replaced.

It is also advantageous if on the basis of the knife motor current and/or its temporal profile, a deburring process of the circular knife is detected, monitored, in particular its duration measured, controlled, in particular ended, and/or a deburring indication signal which indicates an outstanding and/or a completed deburring process is output on the signal output unit. This is possible since even during a deburring process, in particular characteristic temporal profiles of the knife motor current are to be expected. These temporal profiles can be detected by measuring the knife motor current, and a deburring process can thus be detected. For example, it can thus be determined whether the circular knife was deburred at all after the grinding. As needed, a corresponding indication signal, in particular a warning signal, can then be output to the user via the signal output unit. The state of a deburring device used for deburring can also be deduced from the value of the measured knife motor current and/or its temporal profile. This makes it possible, for example, to determine whether and/or to what extent a knife grinding device, in particular its grinding wheel or deburring wheel, is already worn or requires maintenance. It is also possible to derive from the knife motor current whether the grinding wheel or deburring wheel is adjusted correctly or incorrectly, for example with respect to the angle of attack of the grinding wheel or deburring wheel. It can also be detected if a knife grinding device not associated with the slicing machine is used if it deviates from the characteristic knife motor current consumption.

The predefined limit value $G_1$ and/or the dynamically determined limit value $G_2$ can be determined at the start of a knife grinding program based on the current cutting characteristic value. The preference of the user is also included in the formation of the predefined limit value $G_1$ and/or the dynamically determined limit value $G_2$. If a user regularly starts the knife grinding program before or after it is provided for by the predefined limit value $G_1$ and/or the dynamically determined limit value $G_2$, the limit values can be automatically adapted to the user behavior in order to meet the needs of the user.

In one embodiment, the knife motor is operated at a predefined knife speed at the start of the knife grinding program. Slicing machines of the generic type can be operated at various knife speeds in order to optimally adapt the knife speed to the item to be cut. For example, a soft item to be cut, such as cheese, is preferably cut at a slower knife speed, and a hard item to be cut, such as salami or ham, is preferably cut at a higher knife speed. For the grinding process, there is also a preferred knife speed at which the knife motor is operated at the start of the knife grinding program. An optimal knife speed for deburring can also be adjusted for the deburring process.

In one embodiment, the knife motor is operated at a predetermined sensing speed at the start of the knife grinding program. The grinding wheel is placed against the circular knife in this process. The knife motor current is determined and the characteristic of the circular knife is derived therefrom. For example, it can be determined in this way whether the circular knife is a knife with a flute, with toothed knife flanks, or with a coating. In a second step, the knife motor is operated at a predetermined grinding speed, wherein the predetermined grinding speed depends on the characteristic determined in the first step. In the second step, the circular knife is ground with the optimum knife grinding speed for the circular knife.

Other features and advantages of the invention arise from the following detailed description of an exemplary embodiment of the invention with reference to the figures in the drawing, which show details essential to the invention, and from the claims. The individual features can be implemented individually or combined in any combination in variants of the invention. In the schematic drawing, exemplary embodiments of the invention are shown which are explained in more detail in the following description.

Figure 1A:
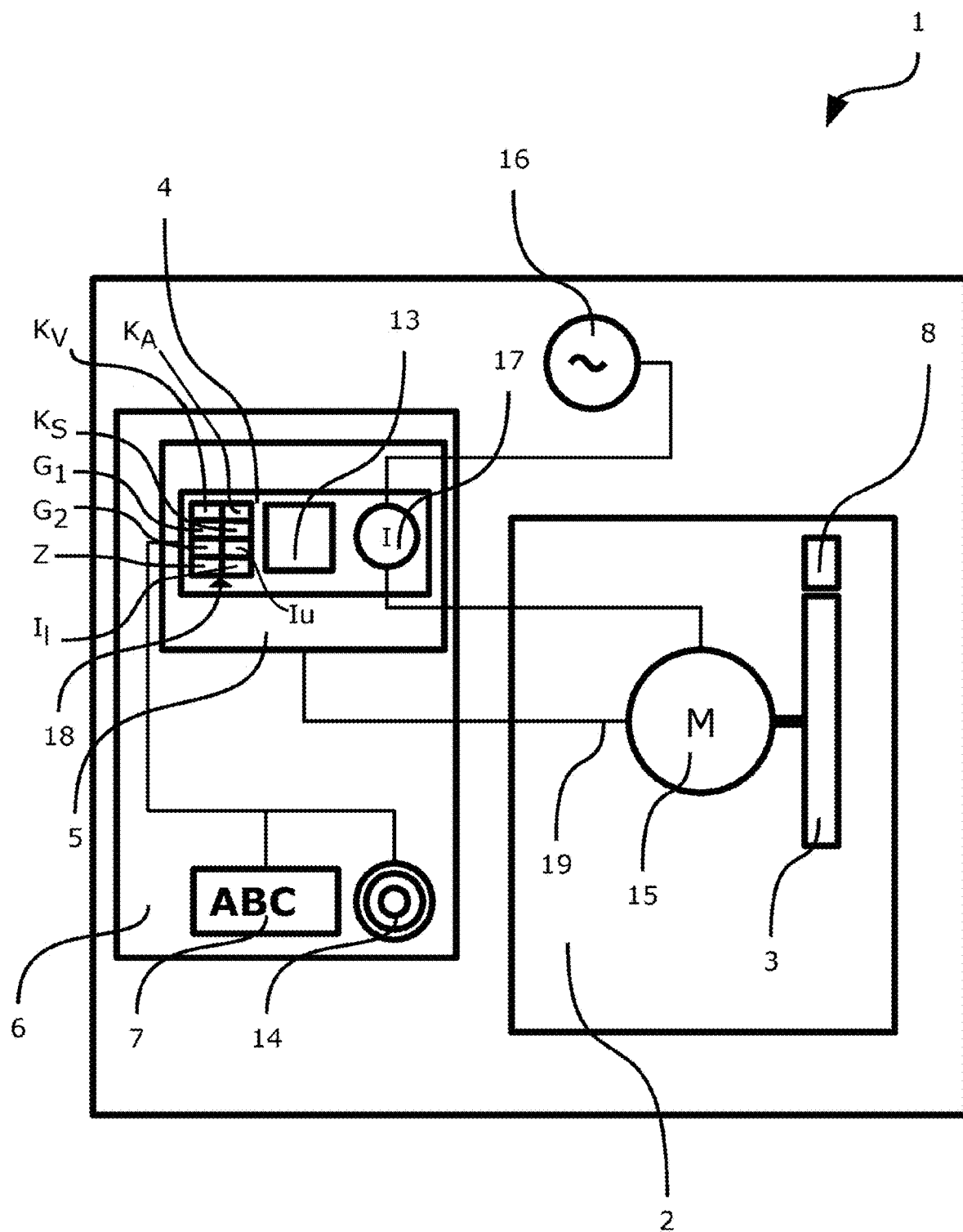
FIG. 1a is a schematic illustration of the slicing machine of FIG. 1.

FIG. 1 shows a perspective view and FIG. 1a shows a very schematic illustration of an electrically operated slicing machine 1 for cutting off slices from, in particular, an elongate item to be cut, preferably food, having a cutting device 2, wherein the cutting device 2 includes a rotating circular knife 3 driven by an electric knife motor 15. The slicing machine 1 has a knife monitoring device (or knife monitor) 4 for monitoring the state of the circular knife 3. The knife monitoring device 4 is integrated into a control unit 5 which is in turn integrated into a signal output unit 6.

The knife monitoring device 4 is electrically connected to the knife motor 15. In particular, the knife monitoring device 4 has a current-measuring device 17 for measuring the knife motor current with which the current flowing through the knife motor 15 can be measured. To this end, the current-measuring device 17 is connected between a motor power supply 16 and the knife motor 15. The knife monitoring device 4, and thus also the control unit 5, also has a non-volatile data memory 18. As can be seen in FIG. 1a, the non-volatile data memory has a plurality of memory areas, in particular for storing a soiling characteristic value $K_V$, a wear characteristic value $K_A$, a knife sharpness characteristic value $K_S$, limit values $G_1$, $G_2$, at least one intermediate result Z as well as a load-independent current component $I_u$ and a load-dependent current component $I_l$.

The control unit 5 is designed as a computer unit on which is executably stored a computer program component in a memory unit of the computer unit. The computer program component is designed to control or implement the method according to the invention to be described in more detail below. For this purpose, the control unit 5 is connected to the knife motor 15 via a control line 19 (FIG. 1a) in order to control said knife motor.

The signal output unit 6 includes a display unit 7 and an acoustic output unit 14 on which indication signals can be output to a user of the slicing machine 1.

FIG. 1 and FIG. 1a also show a grinding device 8. In this exemplary embodiment, the grinding device 8 can be placed onto the slicing machine 1 and removed therefrom. It serves to grind the circular knife 3 as needed.

Furthermore, the slicing machine 1 has a grinding monitoring device 13. The grinding monitoring device 13 is integrated in particular into the knife monitoring device 4 and thus also into the control unit 5. The grinding monitoring device 13 serves to detect or recognize and optionally monitor and control a grinding process performed by means of the grinding device 8.

An item to be cut can be placed onto a carriage 9 (FIG. 1) and fed to the circular knife 3 in order to cut slices. For this purpose, the carriage 9 is arranged movably on the slicing machine 1 in parallel to the circular knife 3.

Cut slices are laid down on a delivery table 12 (FIG. 1) by means of a chain frame 10 (FIG. 1) and a separation device 11 (FIG. 1).

It shall now be explained in more detail below how the control unit 5 monitors the state of the circular knife 3 on the basis of the knife motor current measured by means of the current-measuring device 17 and initiates a grinding process if necessary.

In this respect, FIG. 2a to FIG. 2d show schematic illustrations of the long-term profiles of the current consumption of a slicing machine according to the invention as current (I)/time (t) diagrams. For reasons of easier understanding of the invention, the illustrations are respectively based on the assumption that an approximately identical cutting quantity per unit of time is cut, for example an equal number of slices of an item to be cut with respectively the same properties. However, it is obvious to a person skilled in the art that the invention is not restricted to this special case but can also be used in general without further modifications.

In particular, the long-term temporal profiles of knife motor currents $I_{100}$, $I_{101}$, $I_{102}$, $I_{103}$ during operation of the slicing machine 1 according to the invention can be seen in FIG. 1.

The current/time diagrams of FIG. 2a to FIG. 2d begin in each case at a starting time $t_s$ at which the circular knife 3 (FIG. 1) is respectively freshly ground and deburred.

Until an end time $t_e$, slices can be cut with the circular knife 3. After the time $t_e$, the circular knife 3 is worn to such an extent that it must be ground and deburred again.

Therebetween is an intermediate time $t_z$ up to which the state of the circular knife 3 can be regarded as ideal, whereas the state thereafter up to the time $t_e$ can be classified as at least suitable for normal operation.

All diagrams of FIGS. 2a to 2d show that the knife motor currents $I_{100}$, $I_{101}$, $I_{102}$, $I_{103}$ increase steadily at least approximately. In other words, the power consumption of the knife motors increases approximately continuously.

In FIG. 2a to FIG. 2d, base loads or load-independent current components $I_u$ are also marked. These correspond to the respective no-load currents of the slicing machine 1. It can be seen that the load-independent current components $I_u$ are substantially constant over time. They can be attributed, inter alia, to friction caused by belts, bearings and the like, and to friction which arises, for example, as a result of soiling, in particular fat deposits, of the slicing machine. The load-independent current components $I_u$ shown as constant serve for simplified illustration and ease of understanding. In reality, while the current component $I_u$ caused by friction of belts, bearings and the like rises very slowly, the load-independent current component $I_u$ caused by soiling increases significantly faster. Compared to the variation of the load-dependent current component $I_1$, however, the increase is negligible.

A load-dependent current component $I_l$ (see FIG. 2a) can thus be determined at each time point as the difference between the knife motor current $I_{100}$, and correspondingly also the knife motor currents $I_{101}$, $I_{102}$, $I_{103}$, and the respective load-independent current component $I_U$.

Figure 2A:
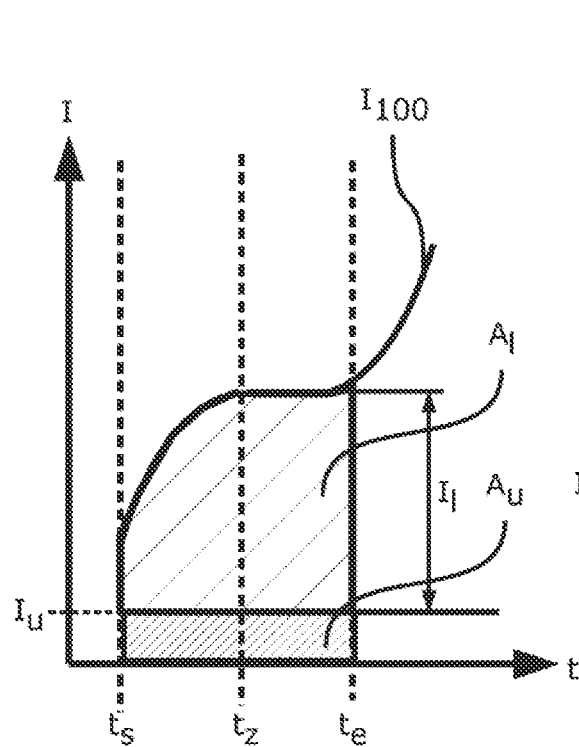
FIGS. 2a to 2d are schematic illustrations of the long-term profiles of the current consumption of a slicing machine.

FIG. 2a also shows two areas $A_u$ and $A_l$ as partial areas under the curves of the knife motor current $I_{100}$ or the load-independent current component $I_u$ and the load-dependent current component $I_1$, in each case calculated from the start time $t_s$.

The areas $A_u$ and $A_l$ together thus correspond to the individual values summed from the start time $t_s$ or the integral value of the knife motor current $I_{100}$. The area $A_l$ corresponds to the summed individual values or the integral value of the load-dependent current component $I_l$. The area $A_u$ corresponds to the summed individual values or the integral value of the load-independent current component $I_u$. The area $A_l$ behaves substantially proportionally to the knife sharpness characteristic value $K_S$. The area $A_u$ behaves substantially proportionally to the soiling characteristic value $K_V$ and/or the wear characteristic value $K_A$.

It has been found that a particularly reliable determination of the knife sharpness characteristic value $K_S$, of the soiling characteristic value $K_V$, and/or of the wear characteristic value $K_A$ is made possible by evaluating these integral values or the areas $A_l$ and $A_u$ since any, possibly short-term, interfering influences can only have a reduced effect on them and differences between the different states of the circular knife 3 or the slicing machine 1 are substantially more pronounced.

It should be noted that the temporal profiles of the knife motor currents $I_{100}$, $I_{101}$, $I_{102}$, $I_{103}$ are shown in simplified form. The actual profile depends inter alia on the item to be cut, in particular on its nature and geometric dimensions, on the circular knife 3 of the slicing machine 1 itself, and on further parameters. In this respect, the knife motor currents $I_{100}$, $I_{101}$, $I_{102}$, $I_{103}$ are illustrated as representatives for families of curves of individually different current profiles, which result from these different influencing factors. FIG. 2a to FIG. 2d also do not show the detailed temporal profile of the knife motor currents $I_{100}$, $I_{101}$, $I_{102}$, $I_{103}$; in particular, variations during the cutting of individual slices, as shown in FIG. 3, are not shown here for reasons of clarity.

Furthermore, FIG. 2a to FIG. 2d show four different constellations of temporal profiles of the knife motor currents $I_{100}$, $I_{101}$, $I_{102}$, $I_{103}$ with highly compressed time scale.

FIG. 2a illustrates the case in which a soft item to be cut is cut at a low base load or a low load-independent current component $I_u$. A low load-independent current component $I_u$ corresponds, for example, to the case of a freshly serviced and cleaned slicing machine 1.

Figure 2B:
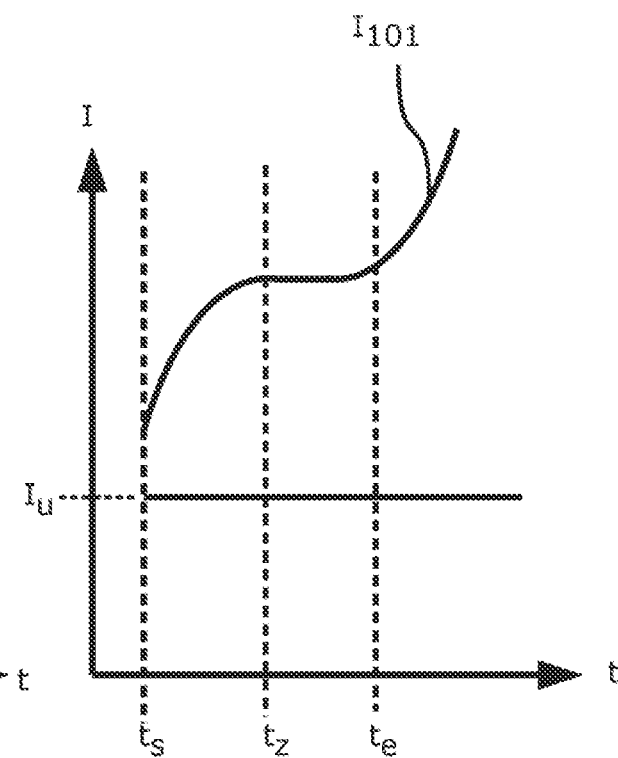
Figure 3:
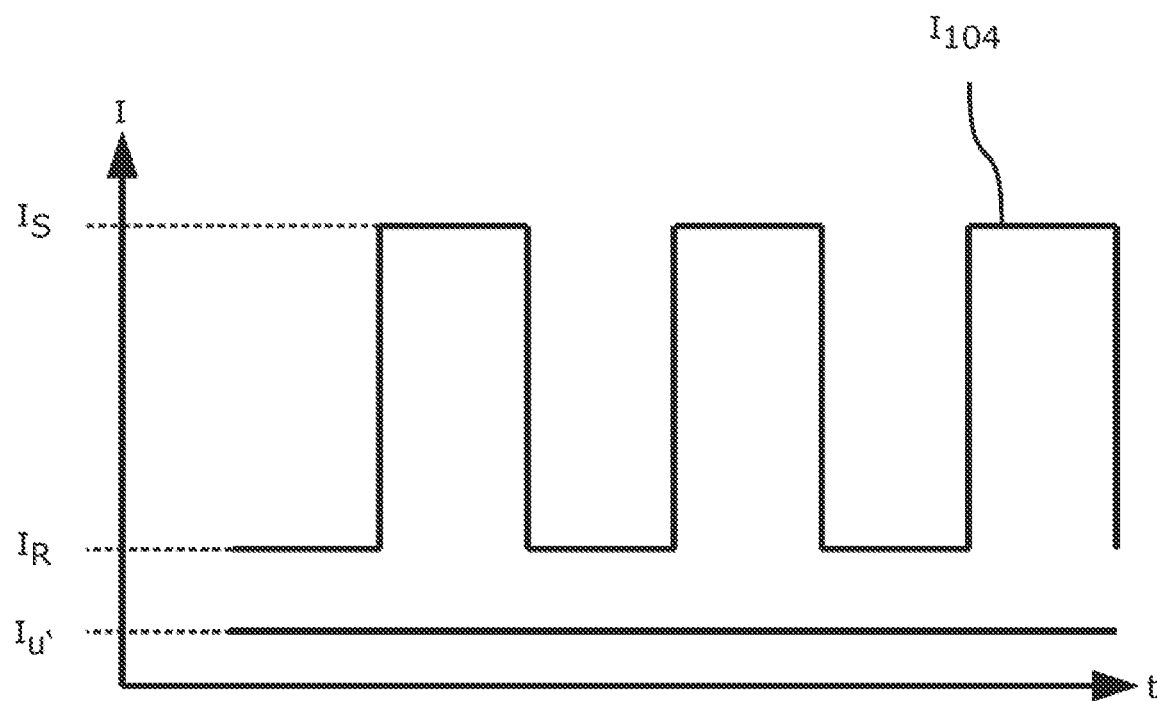
FIG. 3 is a schematic illustration of the short-term profile of the current consumption of a slicing machine when cutting slices.

FIG. 2b shows the case in which a soft item to be cut is cut at a high base load or a high load-independent current component $I_u$.

Figure 2C:
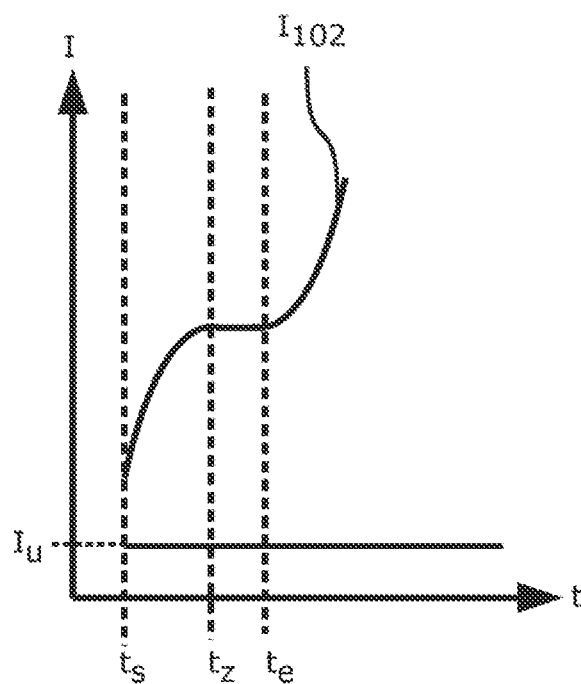

FIG. 2c shows the case in which a hard item to be cut is cut at a low base load or a low load-independent current component $I_u$.

Figure 2D:
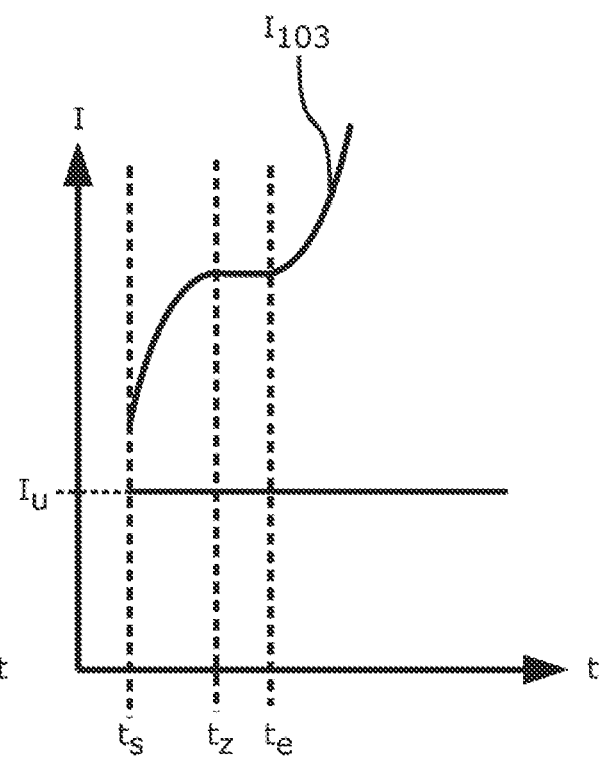

FIG. 2d lastly shows the case in which a hard item to be cut is cut at a high base load or a high load-independent current component $I_u$.

The comparison of FIG. 2a to FIG. 2d shows that with increasing hardness of the item to be cut, the profiles of the knife motor currents $I_{100}$, $I_{101}$, $I_{102}$, $I_{103}$ are compressed over time, thus indicating an accelerated wear of the circular knife 3.

An increasing base load or an increasing load-independent current component $I_u$ in contrast approximately results in a parallel displacement of the profiles of the knife motor currents $I_{100}$, $I_{101}$, $I_{102}$, $I_{103}$. This is accompanied by increased friction independent of the wear of the circular knife.

FIG. 3 illustrates a knife motor current $I_{104}$ of the slicing machine 1 (FIG. 1) during the cutting of individual slices of an item to be cut. The illustrated knife motor current $I_{104}$ corresponds to the sum of the load-dependent current component, i.e. the net current, and the load-independent current component.

The knife motor current $I_{104}$ substantially varies between two current values: During the cutting of a slice, the knife motor current $I_{104}$ corresponds to a cutting current Is. In contrast, between the cutting of two slices, i.e. when the carriage 9 (FIG. 1) of the slicing machine 1 is pushed back, the knife motor current $I_{104}$ corresponds to a substantially lower return movement current $I_R$. The return movement current $I_R$ is in this case slightly stronger than a no-load current or a load-independent current $I_u$.

It can thus in particular be derived from the knife motor current $I_{104}$ whether and, where applicable, how long a slice is cut, whether the carriage 9 is pushed back, or whether the slicing machine 1 is completely at idle. The number of slices cut can thus also be deduced from the knife motor current $I_{104}$, wherein each local maximum of the knife motor current $I_{104}$ in FIG. 3 corresponds to a cut slice.

The illustration is simplified for ease of understanding. The detail shows that the power consumption during a cutting process rises until the circular knife 3 (FIG. 1) reaches the thickest point of the item to be cut and then falls again until the circular knife 3 exists, since both the item to be cut, for example sausage, and the circular knife 3 are usually circular and thus more or less of the item to be cut is cut through depending on the position of the circular knife 3. The greatest friction or braking effect and thus the highest power consumption during the cutting process are thus to be expected as a rule in a middle position in which the overlap of the circular knife 3 and the item to be cut is the largest. However, this effect caused by this overlap is significantly lower than the increase in the power consumption of the knife motor 15 (FIG. 1a) caused by the cutting process itself. The strength of effect also depends on the item to be cut. It is, for example, dependent on the strength of the item to be cut. A clear effect results, for example, in the case of soft sausage or cheese, whereas in the case of comparatively hard, slightly tacky, salami or ham, the effect is only slightly pronounced.

The profile of the knife motor current $I_{104}$ schematically illustrated in FIG. 3 shows three cutting processes, which are carried out within a few seconds. The knife motor currents $I_{100}$, $I_{101}$, $I_{102}$, $I_{103}$ shown in FIG. 2a to FIG. 2d are shown over time between two grinding processes. A circular knife in a slicing machine is to be ground after several days, in particular once a week. The time axis in FIG. 3 is thus in the range of seconds and in FIGS. 2a to 2d in the range of days. If the time axis of FIG. 2a to FIG. 2d were scaled according to that of FIG. 3, the individual cutting processes could also be represented as in FIG. 3.

A realistic pattern of a knife motor current of a slicing machine during operation would be a combination of the profiles of FIGS. 2a to 2d since a mixture of hard and soft items to be cut is cut with an increasingly soiling slicing machine, wherein the slicing machine is cleaned again in the event of increasing soiling. The cleaning of the slicing machine takes place once or a few times per day. The pattern of the knife motor current resulting in reality would be superimposed by individual fluctuations according to FIG. 3. For illustrative purposes, however, the individual effects are shown separately in the individual figures.

Figure 4:
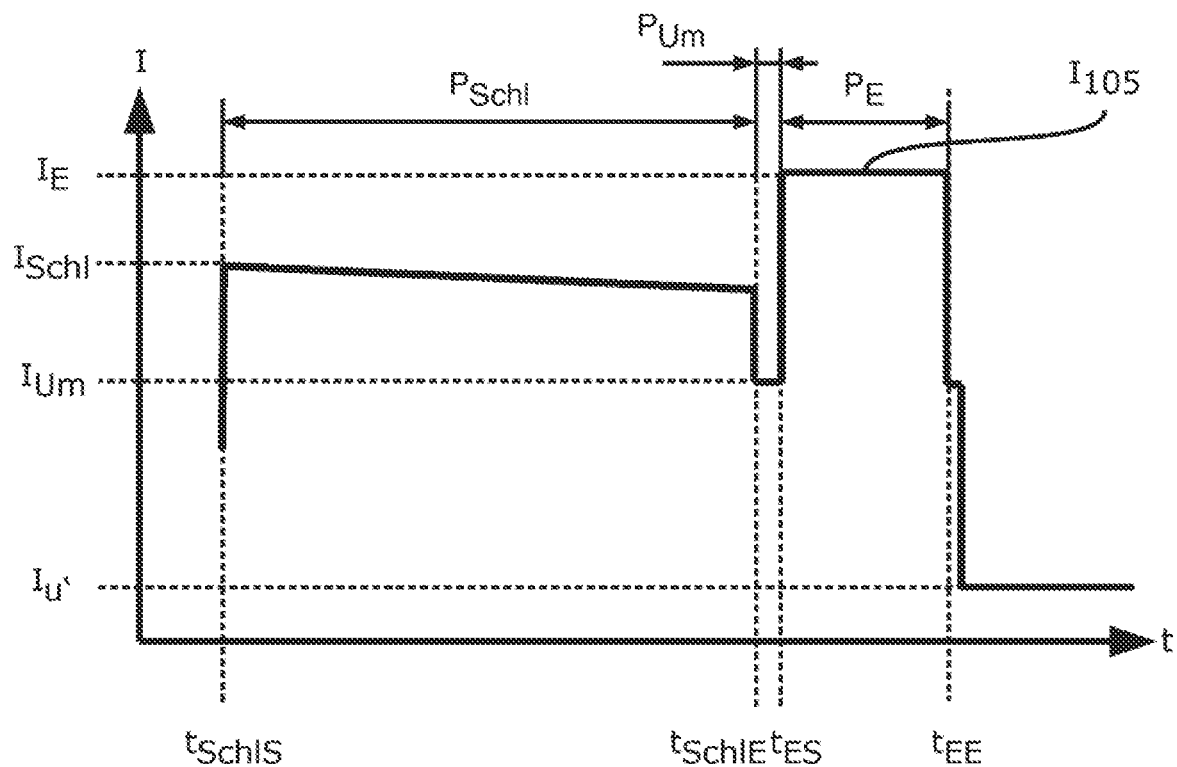
FIG. 4 is a schematic illustration of the short-term profile of the current consumption of a slicing machine during a grinding and deburring process.

FIG. 4 shows the profile of a knife motor current $I_{105}$ during a grinding and deburring process of the circular knife 3 (FIG. 1). The selected time scale is clearly compressed in comparison to FIG. 3 and is not depicted true to scale for illustrative purposes.

Three different phases can in particular be seen: a first grinding phase $P_{Schl}$ between a grinding start time $t_{SchlS}$ and a grinding end time $t_{SclE}$, during which the actual grinding process takes place. This is followed by a switching phase $P_{Um}$, during which switching from the grinding process to the deburring process takes place. From a deburring start time $t_{ES}$, the circular knife is deburred or stripped during a deburring phase PE until a deburring end time $t_{EE}$.

The grinding phase $P_{Schl}$ usually lasts significantly longer, for example at least ten times and in particular approximately twenty times as long, in particular approximately 20 seconds, as the cutting of a slice.

This means that a high current consumption at the level of a grinding current $I_{Schl}$ occurs continuously during the grinding phase $P_{Schl}$. The grinding current $I_{Schl}$ is approximately constant but drops slightly over the grinding process, in particular in the range from 2 to 5%, when viewed in detail. This is because the knife adapts more and more to the shape of a grinding stone of the knife grinding device 8 (FIG. 1).

The switching phase $P_{Um}$, in contrast, is significantly shorter than the grinding phase $P_{Schl}$, in particular approximately 6 seconds. During this phase, switching from the grinding stone to a sharpening stone of the knife grinding device 8 takes place. During this switching, a current consumption takes place at the level of a switching current $I_{Um}$ which is significantly lower than the grinding current $I_{Schl}$.

In contrast, the deburring phase PE lasts approximately 1-2 seconds. During this phase, a current consumption takes place at the level of a deburring current $I_E$ which is substantially stronger than the grinding current $I_{Schl}$. The grinding stone is coarser than the sharpening stone. This explains why deburring or sharpening requires more power than grinding.

The grinding has a certain, predefined power corridor. If the current consumption during the grinding process moves below this power corridor, i.e. significantly too little power is demanded but over a longer period of time, this means that the grinding stone is, for example, contaminated by fat and therefore does not grind properly and must be replaced. In this case, a corresponding indication signal that the grinding stone is to be replaced is output via the signal output unit 6 (FIG. 1) by means of the control unit 5 (FIG. 1) and in particular the grinding monitoring device 13 (FIG. 1).

In contrast, as a result of wear, for example abrasion, the power consumption during the grinding process drops slowly within the power corridor. Analogously, an indication signal is then output to the user when a predefined degree of wear is exceeded.

If the power consumption during the grinding process is not within the power corridor, either an unsuitable knife grinding device 8 is in use or the knife grinding device 8 is not properly mounted and/or adjusted. In this case, an indication signal is output to the user that the knife grinding device 8 must be inspected.

Figure 5:
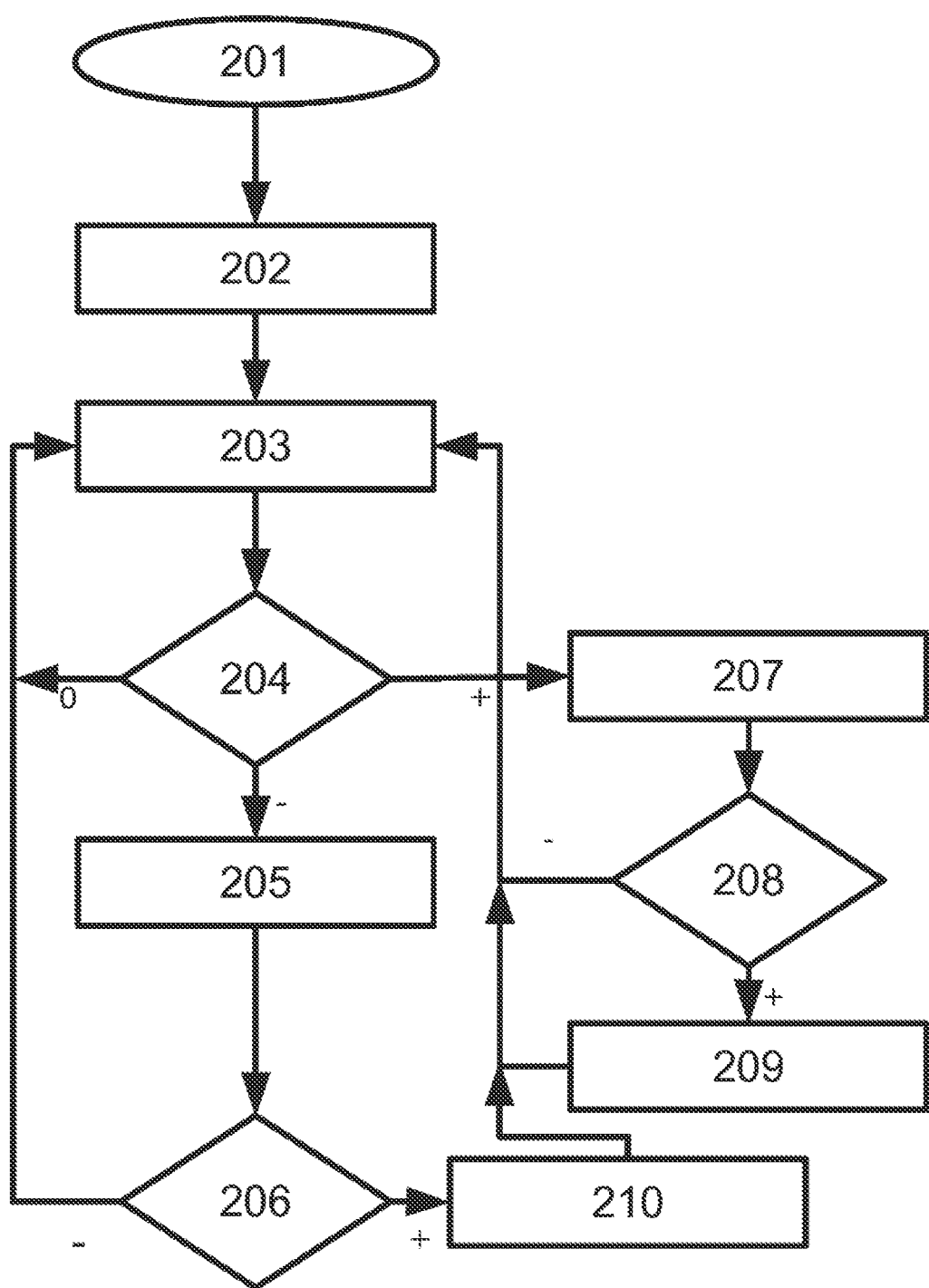
FIG. 5 is a flow diagram for the method according to the invention.

The method according to the invention is now explained in more detail with reference to the flow diagram in FIG. 5:

The method steps shown below are implemented in a computer program component of the control unit 5 and are executed step by step when this computer program component is processed.

The method according to the invention begins with the start of the knife motor 15 (FIG. 1a) according to step 201.

In step 202, after a predefined waiting time of a few seconds has elapsed, the knife motor current is measured and temporarily stored as current load-independent current component $I_u$ in the non-volatile data memory 18 (FIG. 1a) if the measured knife motor current is in a range of permissible values predefined for the load-independent current component $I_u$. If the measured motor current is not in the predefined range for the load-independent current component $I_u$, for example because the item to be cut already touches the circular knife 3 (FIG. 1) before the measurement of the knife motor current $I_u$ is completed, a most recently used value for the load-independent current component $I_u$ previously stored in the non-volatile data memory 18 is retained or, if this value also does not yet exist because the slicing machine 1 (FIG. 1) is used for the first time, a predefined standard value is used as load-independent current component and temporarily stored in the non-volatile data memory 18.

A continuous monitoring of the knife motor current takes place between step 203 and step 206.

For this purpose, the knife motor current is first measured in step 203 and the time of the measurement is temporarily stored.

In step 204, a check is subsequently performed as to whether a slice is cut (marked with the symbol "−" in FIG. 5) or whether the circular knife 3 is ground (marked with the symbol "+" in FIG. 5). The latter is assumed if the measured knife motor current exceeds a predefined grinding current limit value during a period of time which is longer than a multiple of a usual duration of a cutting process, and is approximately constant during this time period. In this case, the method is continued with step 207.

If a slice is cut, i.e. the measured knife motor current moves above the value of the load-independent current component $I_n$ and the measured knife motor current reflects one or more grinding processes, that is the measured knife motor current has local maxima corresponding to FIG. 3 when a slice is cut and local minima when the carriage is pulled back, with respectively predefined time durations, in particular maximum time durations, it is concluded that slices are cut and the method is to be continued with step 205. A cutting process is thus also recognized even if the measured knife motor current during cutting is above the grinding current limit value.

In the event that neither a slice is cut nor the circular knife is ground (marked with the symbol "0" in FIG. 5), the method continues with step 203. In other words, waiting takes place until either a slice is cut or the circular knife 3 is ground. In this method step, the measured knife motor current can be used to determine the current load-independent current component $I_u$ and be temporarily stored in the non-volatile data memory. Thus, the load-independent current component $I_u$ is redetermined at a time point in which no cutting takes place. This is in particular particularly advantageous because, during the course of use of the slicing machine, the load-independent current component $I_u$ can change due to increasing soiling of the slicing machine.

In step 205, i.e. when a slice is cut, a net current is first determined by subtracting the current value of the load-independent current component stored in the non-volatile data memory from the measured knife motor current.

An integral value which is likewise stored in the non-volatile data memory is subsequently increased by the net current multiplied by the time duration between the last two knife motor current measurements according to step 203. If an integral value has not yet been stored in the non-volatile data memory, the value zero is assumed for the original integral value. The new integral value is stored again in the non-volatile data memory.

In step 206, a check is subsequently performed as to whether the integral value exceeds a predefined limit value $G_1$ and the circular knife 3 is thus to be reground.

If this is the case (marked with the symbol "+" in FIG. 5), the method branches further to step 210; otherwise, the method is continued with step 203.

If the circular knife 3 is to be reground, an indication signal is generated in step 210 on the signal output unit 6 of the slicing machine 1 and instructs a user of the slicing machine 1 to grind the circular knife 3. The method subsequently returns to step 203. The user can then install the knife grinding device 8 (FIG. 1) and start the grinding process.

In steps 207, 208, and 209, the grinding process is then monitored.

For this purpose, the duration of the grinding process is first determined in step 207. If this duration exceeds a predefined minimum duration, the integral value is reset to the value zero. However, if the minimum duration is not reached, i.e. the circular knife 3 has not been ground sufficiently long, the integral value is only reset proportionately, for example by half. This ensures that the next grinding process is indicated correspondingly earlier.

Then, a counter of the total number of grinding processes of the circular knife 3 is incremented.

In step 208, a check is subsequently performed as to whether this total number exceeds a predefined maximum number of grinding processes.

If this is the case (marked with "+" in FIG. 5), an indication signal that the circular knife 3 is to be replaced is output in step 209 on the signal output unit 6. The method is subsequently continued again with step 203.

If this is not the case (marked with the symbol "−" in FIG. 5), the method is continued directly with step 203.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Below is a Listing of Reference Numerals Used Herein:
1 Slicing machine
2 Cutting device
3 Circular knife
4 Knife monitoring device
5 Control unit
6 Signal output unit
7 Display unit
8 Knife grinding device
9 Carriage
10 Chain frame
11 Separation device
12 Delivery table
13 Grinding monitoring device
14 Acoustic output unit
15 Knife motor
16 Motor power supply
17 Current-measuring device
18 Non-volatile data memory
19 Control line
201, 202, 203, 204, 205,
206, 207, 208, 209, 210 Method step
$A_u$, $A_l$ Area
$G_1$, $G_2$ Limit value
I Current
$I_{100}$, $I_{101}$, $I_{102}$, $I_{103}$, $I_{104}$, $I_{105}$ Knife motor current
$I_E$ Deburring current
$I_l$ Load-dependent current component
$I_R$ Return movement current
$I_S$ Cutting current
$I_{Schl}$ Grinding current
$I_u$, $I_{u'}$ Load-independent current component
$I_{Um}$ Switching current
$K_A$ Wear characteristic value
$K_S$ Knife sharpness characteristic value
$K_V$ Soiling characteristic value
$P_{Schl}$ Grinding phase
$P_{Um}$ Switching phase
$P_E$ Deburring phase
t Time
$t_s$ Start time
$t_{SchlS}$ Grinding start time
$t_{SclE}$ Grinding end time
$t_{ES}$ Deburring start time
$t_{EE}$ Deburring end time
$t_e$ End time
$t_z$ Intermediate time
Z Intermediate result

The invention claimed is:

1. An electrically operated slicing machine, the slicing machine comprising:
   a circular blade configured to be rotatably driven by an electric blade motor;
   a carriage movable in parallel to the circular blade and configured to receive and move material to be cut by the circular blade during a cutting operation; and
   a controller, the controller being configured to execute a method for monitoring the electrically operated slicing machine, the method comprising:
      executing a blade grinding program, the blade grinding program being different from the cutting operation, the blade grinding program comprising:
         detecting, as measurement data from the electric blade motor during a grinding of the circular blade with a grinder, a blade motor current and a chronological sequence of the blade motor current; and
         monitoring and controlling the grinding of the circular saw blade with the grinder during the blade grinding program based on the measurement data detected during grinding of the circular saw blade with the blade grinder;
      detecting, monitoring, or controlling a deburring process of the circular blade based on detecting a further measurement of the blade motor current and a further chronological sequence of the blade motor current, the detecting of the further measurement of the blade motor current and the further chronological sequence of the blade motor current occurring subsequent to the detecting of the measurement data during the grinding of the circular blade with the grinder,
      wherein the detecting, monitoring, or controlling the deburring process of the circular blade comprises detecting the deburring process has occurred based on detecting, from the further measurement of the blade motor current and the further chronological sequence of the blade motor current, a short-term power consumption drop and then a subsequent short-term power consumption increase, the short-term power consumption drop corresponding to switching to a sharpening stone, and the subsequent short-term power consumption increase corresponding to deburring the circular blade.

2. The slicing machine according to claim 1, wherein the slicing machine comprises:
   a non-volatile data memory; and
   wherein the controller is further configured to store, in the non-volatile data memory: a currently measured value of the blade motor current, the chronological sequence of the blade motor current, or intermediate results comprising an integral value of a net current of the blade motor starting from a completion of a previously run blade grinding program.

3. The slicing machine according to claim 1, wherein the controller is further configured to determine a slicing characteristic value, which comprises: a contamination characteristic value, a wear characteristic value, or a blade sharpness characteristic value.

4. The slicing machine according to claim 1, the slicing machine further comprising a display configured to indicate a necessity of an introduction of the blade grinding process based on the condition of the circular blade.

5. A method for monitoring an electrically operated slicing machine, the slicing machine comprising: a circular blade configured to be rotatably driven by an electric blade motor; and a carriage movable in parallel to the circular blade and configured to receive and move material to be cut by the circular blade during a cutting operation, the method comprising:
   executing a blade grinding program, the blade grinding program being different from the cutting operation, the blade grinding program comprising:
      detecting, as measurement data from the electric blade motor during a grinding of the circular blade with a grinder, a blade motor current and a chronological sequence of the blade motor current; and
      monitoring and controlling the grinding of the circular blade with the grinder during the blade grinding program based on the measurement data detected during the grinding of the circular blade with the grinder; and
   detecting, monitoring, or controlling a deburring process of the circular blade based on detecting a further measurement of the blade motor current and a further chronological sequence of the blade motor current, the detecting of the further measurement of the blade motor current and the further chronological sequence of the blade motor current occurring subsequent to the detecting of the measurement data during the grinding of the circular blade with the grinder,
   wherein the detecting, monitoring, or controlling the deburring process of the circular blade comprises detecting the deburring process has occurred based on detecting, from the further measurement of the blade motor current and the further chronological sequence of the blade motor current, a short-term power consumption drop and then a subsequent short-term power consumption increase, the short-term power consumption drop corresponding to switching to a sharpening stone, and the subsequent short-term power consumption increase corresponding to deburring the circular blade.

6. The method according to claim 5, the method further comprising, during the execution of the blade grinding program:
   determining, as the measurement data, a load-dependent current component during a state where the blade is being ground and a load-independent current component of the blade motor current;
   determining a contamination characteristic value or a wear characteristic value from the load-independent current component; and
   determining a blade sharpness characteristic value from the load-dependent current component.

7. The method according to claim 5,
   wherein the detecting the blade motor current as part of the measurement data from the electric blade motor during the grinding of the circular blade with the grinder comprises detecting the blade motor current while the electric blade motor is operated at a first predetermined speed at a start of the grinding, and
   wherein the monitoring and controlling the grinding of the circular blade with the grinder during the blade grinding program based on the measurement data detected during the grinding of the circular blade with the grinder as part of the grinding operation comprises:
      determining whether the circular blade comprises a flute, toothed knife flanks, or a coating based on the detecting of the blade motor current detected while the electric blade motor is operated at the first predetermined speed at the start of the grinding of the circular blade; and operating the electric blade motor at a second speed, the second speed being set based on whether the circular blade comprises the flute, the toothed knife flanks, or the coating.

8. The method according to claim 5, the method further comprising, during the executing of the blade grinding program, measuring an idle current of the blade motor, and determining a load-independent current component based on the idle current.

9. The method according to claim 5, wherein the measurement data or intermediate results determined from the measurement data are temporarily stored in a non-volatile data memory.

10. The method according to claim 5, wherein upon completion of the blade grinding program, the method further comprises:
    resetting an integral value of a net current of the electric blade motor, and
    subsequently executing the cutting operation and determining a slicing characteristic value based on the integral value.

11. The method according to claim 10, wherein the resetting of the integral value of the net current of the electric blade motor comprises determining that a duration of the blade grinding program has not reached a minimum duration and proportionally resetting the integral value to a value greater than zero.

12. The method according to claim 5,
    wherein the blade grinding program is automatically startable based upon detecting a dynamically determined limit value of a cutting characteristic of the blade and manually startable by a user, the method further comprising:
    adjusting the dynamically determined limit value automatically based on the user manually starting the blade grinding program.

13. The method according to claim 5, the method further comprising automatically starting the blade grinding program to sharpen the circular blade based upon a slicing characteristic value reaching, exceeding, or falling below a predefined limit value or a dynamically determined limit value, the slicing characteristic value being derived from the blade motor current and the chronological sequence of the blade motor current during the cutting operation.

14. The method according to claim 13, wherein the blade grinding program is automatically started upon the slicing characteristic value reaching, exceeding, or falling below the dynamically determined limit value, and wherein the dynamically determined limit value is determined from a current slicing characteristic value at a start of the blade grinding program, the current slicing characteristic value being derived from the measurement data.

15. The method according claim 5, the method further comprising outputting a deburring notification signal indicating that the deburring process is pending or that the deburring process has taken place.

16. The method according to claim 5, the method further comprising operating the electric blade motor at a predetermined grinding speed at a start of the grinding program.

17. The method according to claim 16, the method further comprising, during execution of the blade grinding program:
    in a first step, during the start of the blade grinding program and as part of executing the detecting of the measurement data, the electric blade motor is operated at a predetermined detection speed, the blade motor current is determined, and characteristics of the circular blade are determined based on the blade motor current measured in the first step; and
    in a second step, which is part of executing the detecting, monitoring, or controlling the operation of the slicing machine in the blade grinding program, operating the electric blade motor at a predetermined grinding speed and grinding the circular blade,
    wherein the predetermined grinding speed depends on the characteristics determined in the first step.

18. The method according to claim 5, wherein the blade motor current detected as the measurement data is detected with a precision in the range from 1 to 10 percent of an average blade motor current during the execution of the blade grinding program.

19. The method according to claim 5, the method further comprising, during the executing of the blade grinding program:
    outputting an indication signal that a grinding wheel is to be replaced based on determining that a power consumption during the grinding has dropped below a predetermined value; or
    outputting an indication signal that the grinding is not running correctly or the grinder is worn or mounted incorrectly based on determining that the power consumption is outside of a predetermined range.

20. The method according to claim 5, the method further comprising:
    automatically starting the grinding program and the grinder based on a predetermined state of the blade.

* * * * *